United States Patent [19]

Skripchik et al.

[11] 4,425,267

[45] Jan. 10, 1984

[54] WOOD MODIFYING COMPOSITION COMPRISING AN AQUEOUS SOLUTION OF PHENOLIC ALCOHOLS, UREA AND SODIUM PENTACHLOROPHENATE

[76] Inventors: Lilia P. Skripchik, ulitsa Koltsova, 4, Korpus 3, kv. 59; Gennady M, Shutov, ulitsa Lomonosova, 10, kv. 33, both of Minsk, U.S.S.R.

[21] Appl. No.: 296,627

[22] Filed: Aug. 27, 1981

[51] Int. Cl.³ .............................................. C09K 3/28
[52] U.S. Cl. .................................................... 252/607
[58] Field of Search ........................................ 252/607

[56] References Cited

U.S. PATENT DOCUMENTS 2,606,115  8/1952  Nuessle et al. ..................... 252/607
3,378,381  8/1968  Draganov ........................... 252/607

*Primary Examiner*—Maurice J. Welsh
*Attorney, Agent, or Firm*—Burgess, Ryan & Wayne

[57] ABSTRACT

A wood modifying composition comprises an aqueous solution of phenolic alcohols, urea, and sodium pentachlorophenate serving as a fire-retardant additive, the proportions of the components, in percent by weight, being as follows:
  phenolic alcohols: 30 to 35
  urea: 18 to 20
  sodium pentachlorophenate: 2.8 to 4.0
  water: the balance to 100.

1 Claim, No Drawings

WOOD MODIFYING COMPOSITION COMPRISING AN AQUEOUS SOLUTION OF PHENOLIC ALCOHOLS, UREA AND SODIUM PENTACHLOROPHENATE

FIELD OF THE INVENTION

The present invention is generally concerned with the wood-working industry, and has particular reference to wood modifying compositions.

The present invention can be most advantageously used in the building industry, car building, railway transport, for venting pipe stacks, mineral fertilizer storage facilities, livestock breeding facilities, and for other building and construction projects.

DESCRIPTION OF THE PRIOR ART

Concurrent with the well known advantages, natural wood, used as building and construction material, has some serious disadvantages. Therefore, the improvement of the natural wood properties makes it possible not only to increase the durability of wood to be used in building and construction projects, but also to expand the scope of application for wood and to provide a wider usage of softer leaf wood species and birch wood.

For the purpose of wood modification, the most suitable are resins featuring low viscosity and polarity, easily penetrating into the wood, and curing at temperatures not exceeding 150° C.

There are well known wood modifying compositions based on phenolic alcohols being comparatively low-molecular weight and low-viscosity products which, while penetrating into the wood under pressure, are readily absorbed by the cell walls of the wood, thus causing its swelling.

Known in the prior art is a composition for producing a difficult to burn wood, which composition is based on phenolic alcohols containing a fire-retardant additive, e.g. diammonium phosphate (Cf. USSR Inventor's Certificate No. 178,087, Int. Cl. No. B 27 K 3/34).

The poor compatibility of phenolic alcohols and diammonium phosphate caused by a decrease in the pH value of the solution down to 5 to 6 when adding the fire-retardant, results in further polymerization of the phenolic alcohols. In turn, the life time of the modifying composition is defined by the degree of polymerization of the starting phenolic alcohols and does not exceed, in this case, 12 hours, which is not warranted economically in case of a large-scale wood modification process.

Furthermore, the weight losses suffered, upon combustion, by the wood impregnated with the aqueous solution of phenolic alcohols containing diammonium phosphate as an additive, amount to 54%.

Also known is a wood modifying composition comprising an aqueous solution of phenolic alcohols in an amount of 30 to 35 weight %, urea in an amount of 12 to 15 mass %, ammonia in an amount of 2.3 to 2.7 weight %, and an ammonium salt in an amount of 7 to 10 weight % (Cf. USSR Inventor's Certificate No. 674,904, Int. Cl. No. B 27 K 3/52).

The life time of such a composition is a mere 30 days even for phenolic alcohols with a water solubility as high as 1:10.

SUMMARY OF THE INVENTION

Accordingly, it is an object of the present invention to provide a wood modifying composition having an increased life time.

Another object of the present invention is to provide a wood modifying composition which provides a difficult to burn wood.

With these and other objects in view, there is provided a wood modifying composition comprising an aqueous solution of phenolic alcohols, urea, and a fire-retardant additive, wherein, according to the invention, the fire-redardant additive is sodium pentachlorophenate, the proportions of the components, in percent by weight, being as follows:
phenolic alcohols: 30 to 35
urea: 18 to 20
sodium pentachlorophenate: 2.8 to 4.0
water: the balance to 100.

Modification of wood by the composition comprising sodium pentachlorophenate serving as a fire-redardant additive, with a given proportions of the components, makes it possible to obtain difficult to burn modified wood. The life time of such a composition is 90 days.

The present invention will be more fully understood from the detailed description of its embodiments that follows.

DETAILED DESCRIPTION OF THE INVENTION

The wood modifying composition based on phenolic alcohols is prepared as follows. Urea and sodium pentachlorophenate are added in succession to an aqueous solution of phenolic alcohols taken at room temperature. The resultant mixture is thoroughly stirred until full dissolution of the components added. The lfe time of the composition so obtained is 90 days.

Wood modified with such composition features properties of a hard-burning material. The weight losses suffered by the modified wood upon combustion amount to between 6 and 8 percent.

The production of the modified wood with the use of herein-proposed composition is carried out using the following technique:
(a) the wood is impregnated with the proposed modifying composition using the vacuum-pressure method;
(b) the impregnated wood is seasoned at a temperature of from 15° to 20° C. for 8-24 hours;
(c) the impregnated wood is subjected to heat treatment, with the temperature incrementally raised from 60° to 120° C.

The moisture content of the modified wood obtained using the above technique should not exceed 12%. The content of such modifying composition (impregnant) in the wood amounts to between 35 and 40%.

Given below are typical examples illustrating the present invention in certain aspects and bringing out more clearly the features and advantages specific to it.

EXAMPLE 1

Added in succession to an aqueous solution of phenolic alcohols taken at room temperature were urea and sodium pentachlorophenate, the proportions of the components, in percent by weight, being as follows:
phenolic alcohols (water solubility 1:10): 35.0
urea: 18.0
sodium pentachlorophenate: 2.8 water: 44.2

The resultant mixture was thoroughly stirred until full dissolution of the components added.

The life time of the resultant composition was 90 days.

Impregnation of wood with said composition was carried out using the vacuum-pressure method. The impregnant was cured in the wood by heat treatment, with the temperature raised incrementally from 60° to 120° C. Curing time at 60° C. was 4 hours; at 80° C., 2 hours; at 100° C., 1 hour; at 120° C., 2 hours. The result was a hard-burning wood-polymer material.

The content of the impregnant in the wood amounted to 37%. The mass losses of the modified wood when tested for resistance to fire were 7.8%.

EXAMPLE 2

Urea and sodium pentachlorophenate were added in succession to an aqueous solution of phenolic alcohols taken at room temperture, the proportions of the components, in percent by weight, being as follows:

phenolic alcohols (water solubility 1:7): 35.0
urea: 19.0
sodium pentachlorophenate: 3.5
water: 42.5

The mixture was thoroughly stirred until full dissolution of the components added. The life time of the composition so obtained was 60 days.

Impregnation of wood with said composition was carried out using the vacuum-pressure method. The impregnant was cured in the wood by heat treatment, with temperature incrementally raised from 60° to 120° C. Curing time at 60° C. was 4 hours; at 80° C., 2 hours; at 100° C., 1 hour; at 120° C., 2 hours. The result was a hard-burning wood-polymer material. The content of the impregnant in the wood was 35%. The weight losses of the modified wood when tested for fire resistance, were 7.3%.

EXAMPLE 3

Urea and sodium pentachlorophenate were added in succession to an aqueous solution of phenolic alcohols taken at room temperature, the proportions of the components, in percent by weight, being as follows:

phenolic alcohols (water solubility 1:10): 30
urea: 20
sodium pentachlorophenate: 4.0
water: 46.0

The resultant mixture was thoroughly stirred until full dissolution of the components added. Impregnation of the wood with said composition was carried out using the vacuum-pressure method. The impregnant was cured in the wood by heat treatment, with temperature incrementally raised from 60° to 120° C. Curing time at 60° C. was 4 hours; at 80° C., 2 hours; at 100° C., 1 hour; at 120° C., 2 hours. The result was a difficult to burn wood-polymer material. The content of the impregnant in the wood was 40%. The weight losses as tested for resistance to fire were 6.4%.

In describing the above examples, a limited specific terminology has been used for greater clarity. It will be understood, however, that the present invention is by no means restricted by the terminology adopted herein and that each of the terms used covers all equivalent elements such as may serve the same functions and be used to solve the same problems.

Although the present invention has been described herein with reference to the preferred typical embodiments thereof, it will be apparent to those skilled in the art that there may be minor modifications made in the wood modifying composition of the present invention.

What is claimed is:

1. A wood modifying composition comprising an aqueous solution of phenolic alcohols, urea, and sodium pentachlorophenate serving as a fire-retardant additive, the proportions of the components, in percent by weight, being as follows:

phenolic alcohols: 30 to 35
urea: 18 to 20
sodium pentachlorophenate: 2.8 to 4.0
water: the balance to 100.

* * * * *